(12) United States Patent
Tamada

(10) Patent No.: US 7,551,537 B2
(45) Date of Patent: Jun. 23, 2009

(54) METHOD AND APPARATUS FOR MAKING MASTER OPTICAL DISK

(75) Inventor: Sakuya Tamada, Tokyo (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 10/498,693

(22) PCT Filed: Oct. 14, 2003

(86) PCT No.: PCT/JP03/13130

§ 371 (c)(1),
(2), (4) Date: Apr. 8, 2005

(87) PCT Pub. No.: WO2004/036565

PCT Pub. Date: Apr. 29, 2004

(65) Prior Publication Data

US 2005/0180302 A1   Aug. 18, 2005

(30) Foreign Application Priority Data

Oct. 15, 2002 (JP) ............................. 2002-300839
Oct. 15, 2002 (JP) ............................. 2002-300840

(51) Int. Cl.
*G11B 7/00* (2006.01)
(52) U.S. Cl. .................................... 369/100
(58) Field of Classification Search ................. 360/100
See application file for complete search history.

(56) References Cited

U.S. PATENT DOCUMENTS 5,494,781 A   2/1996   Ohtani et al.
5,726,756 A * 3/1998   Aki et al. .................... 356/630
6,118,574 A * 9/2000   Imanishi et al. ............. 359/305

(Continued)

FOREIGN PATENT DOCUMENTS

JP   2000-033487   2/2000

(Continued)

OTHER PUBLICATIONS

European Search Report corresponding to EP Ser. No. 03808900.9; Sep. 1, 2008.

(Continued)

*Primary Examiner*—Tan X Dinh
(74) *Attorney, Agent, or Firm*—Sonnenschein Nath & Rosenthal LLP

(57) ABSTRACT

An optical recording medium master disc exposure apparatus comprises a modulating means 3 for modulating intensity of light from an exposure light source 1 in response to recording information and a focusing optical system 9 for focusing the light modulated by this modulating means 3 on a photoresist 12 on an optical recording medium master disc 11 to thereby pattern-expose the photoresist 12 in response to recording information. The exposure light source 1 is composed of a ultrashort wave pulse laser with a repetitive frequency of an integral multiple ranging from 1 time to 20 times as high as the clock frequency of recording information. This optical recording medium master disc apparatus includes an external synchronizing mechanism to vary the resonator length of this ultrashort wave pulse laser to mode-lock the repetitive frequency of the ultrashort wave pulse laser in synchronism with the clock frequency to cause the ultrashort wave pulse laser to emit pulses, and hence miniscule pits can be formed with high accuracy.

18 Claims, 6 Drawing Sheets

U.S. PATENT DOCUMENTS

| | | | |
|---|---|---|---|
| 6,208,611 B1 * | 3/2001 | Arima | 369/112.02 |
| 6,285,002 B1 | 9/2001 | Ngoi | |
| 6,580,678 B2 * | 6/2003 | Kondo et al. | 369/275.2 |
| 6,704,096 B1 * | 3/2004 | Takeda et al. | 369/121 |
| 6,791,938 B2 * | 9/2004 | Endoh | 369/275.4 |
| 6,934,244 B2 * | 8/2005 | Tanaka et al. | 369/275.4 |
| 6,975,578 B2 * | 12/2005 | Endoh et al. | 369/275.4 |
| 7,193,961 B2 * | 3/2007 | Suenaga et al. | 369/275.4 |

FOREIGN PATENT DOCUMENTS

| | | | | |
|---|---|---|---|---|
| JP | 2000-33487 | | 2/2000 | |
| JP | 2004-039011 | * | 5/2004 | 369/100 |

OTHER PUBLICATIONS

Takeda M. et al., "Deep UV Mastering Using An All-Solid-State 266 NM Laser for an Over 20 Gbytes/Layer Capacity Disk"; Japanese Journal of Applied Physics, Tokyo, Japan; vol. 38, No. 3B; Mar. 1, 1999; pp. 1837-1838.

Rotermund, F. et al.; "Generation of the Fourth Harmonic of a Femotosecond Ti:Sapphire Laser"; Optics Letters, OSA, Optical Society of America, Washington, DC; vol. 23, No. 13,; Jul. 1, 2008; pp. 1040-1042.

Michio Oka, et al.; "An All-Solid-State Continuous-Wave 266 nm Laser for Optical Disk Mastering"; Proceedings of the Spie ; vol. 3401,; Jan. 1, 2008; pp. 44-47.

Schwarz, CH J. et al.; "Demonstration of Two-Photon Lithography"; Journal of Vacuum Science and Technology: Part B. AVS /AIP, Melville, NY; vol. 19, No. 6; Nov. 1, 2001; pp. 2362-2365.

Yablonovitch E., et al.; Optical Projection Lithography at Half the Ralleigh Resolution Limit by Two-Photon Exposure:; Optical Engineering, Soc. of Photo-Optical Instrumentation Engineers; vol. 38, No. 2; Feb. 1, 1999; pp. 334-338.

Witzgall, G. et al.; "Single-Shot Two-Photon Exposure of Commercial Photoresist for the Production of Three-Dimensional Structures"; Optics Letters, OSA, Optical Society of America, Washington, DC; vol. 23, No. 22; Nov. 15, 1998; pp. 1745-1747.

Wu, E. S. et. al., "Two-Photon Lithography for Microelectronic Application"; Optical / Laser Microlithography 5, San Jose, CA; vol. 1674, pp. 776-782; Mar. 11, 1992.

Bartels, A. et al., "Femtosecond Ti:sapphire Ringer Laser With a 2-GHz Repetition Rate and its Application in Time-Resolved Spectroscopy"; Optics Letters, OSA, Optical Society of America, Washington, DC; vol. 24, No. 14, Jul. 15, 1999; pp. 996-998.

Ramaswamy-Paye, M. et al.; "Compact Dispersion-compensating Geometry for Kerr-Lens Mode-Locked Fentosecond Lasers"; Optics Letters, OSA, Optical Society of America, Washington, DC; vol. 19, No. 21; Nov. 1, 1994; pp. 1756-1758.

* cited by examiner

METHOD AND APPARATUS FOR MAKING MASTER OPTICAL DISK

BACKGROUND OF THE INVENTION

The present invention relates to an optical recording medium master disc exposure apparatus and an optical recording medium master disc exposure method in which patterns corresponding to recording information are exposed with irradiation of light from an exposure light source on an optical recording medium master disc coated with a photoresist.

SUMMARY OF THE INVENTION

An optical recording medium master disc that is used to produce an optical recording medium such as various kinds of optical disc and a magneto-optical disc such as a CD (Compact Disc), a MD (Mini Disc) and a DVD (Digital Versatile Disc) is produced by exposing and developing, that is, cutting concave and convex patterns corresponding to recording information formed on the surface of the photoresist deposited on a disc-like master disc substrate, for example.

A mastering apparatus for cutting concave and convex patterns, that is, an optical recording medium master disc exposure apparatus exposes the optical recording medium master disc by irradiating laser beams of very small spot, which is reduced up to the diffraction limit, with a wavelength of about 400 nm emitted from an exposure light source on the master disc coated with the resist through an objective lens from a continuous oscillation solid-state laser light source of ultraviolet wavelength region such as a Kr laser ($\lambda$=413 nm) and an Ar laser ($\lambda$=351 nm).

Various kinds of the above-mentioned optical recording mediums are required to reduce a work dimension of pits or grooves as they become higher in density in order to increase a recording capacity. However, as a demand for establishing a work dimension under 0.25 μm as a work dimension of pits, it becomes impossible to sufficiently reduce the spot diameter of laser light in the wavelength of a gas laser for use with the above-mentioned optical recording medium master disc exposure apparatus by a lens with a numerical aperture NA of approximately 1 of a condenser lens. For this reason, at present, when the optical recording medium master disc is manufactured, it is extremely difficult to form pits of equal to or less than 0.25 μm at high accuracy.

For example, as a technology for processing microminiaturized patterns, there has been reported an example in which a semiconductor laser excitation high output green laser with a wavelength of 532 nm is used as an excitation light source, a second higher harmonic wave generating device having an external resonator structure is used to emit ultraviolet laser light having a wavelength of 266 nm and an Airy spot of 0.36 μm is obtained as a beam spot size by an non-aberration objective lens with a numerical aperture NA=0.9 (see Japanese laid-open patent application No. 7-98891, for example).

In recent years, optical discs are becoming higher in recording density increasingly, and very small pits, for example, pits of equal to or less than 0.2 μm are indispensable for increasing recording density of optical discs. Thus, a light source with a shorter wavelength has been requested so far. As a continuous oscillation laser light source having stability, low noise and beam quality that can be used by an optical recording medium master disc exposure apparatus, there is now commercially available a Deep UV oscillation water-cooled argon laser in which a nonlinear optical crystal such as a $BaB_2O_4$ (BBO) is disposed within the resonator of the argon gas laser (which can generate an output of 40 mW at a wavelength of 229 nm and an output of 100 mW at a wavelength of 238 nm). However, the wavelength ratio is 229/266=0.86, and in order to obtain a resolution of equal to or less than 0.2 μm, it is necessary to use an objective lens with a higher numerical aperture NA. At the same time, a large quantity of cooling water is used and this argon gas laser has a disadvantage to make countermeasures to avoid vibrations within equipment into which this argon laser is assembled.

Further, as an optical system with a high numerical aperture NA, a means using a near-field optical system that uses a solid immersion lens (SIL) with a numerical aperture NA>1 has been examined from a technology standpoint. However, this means encounters with problems, in which it has a working distance equal to or less than 100 nm, for example, very short as several 10s of nanometers, an optical recording medium master disc should be protected from being smudged by dusts with great care, the surface of the optical recording medium master disc should have a smooth surface with great care and in which the revolution rate of the optical recording medium master disc cannot be increased so much.

As another means for providing high resolution, there has been proposed in recent years a miniscule pit processing method using an electron beam exposure apparatus (see Japanese patent No. 3233650, for example).

However, a method using electron beams needs a vacuum apparatus and an apparatus using this electron beam method requires a glass master disc highly-accurate and high-speed rotation mechanism in the vacuum state so that this apparatus becomes large in size unavoidably.

On the other hand, since a chirp correction dielectric mirror including a negative group velocity dispersion is developed recently, several ultrashort wave pulse laser light sources composed of a Ti:Sapphire (titanium sapphire) which can realize a high repetitive frequency of a Kerr lens mode lock system by a very compact arrangement without using a prism pair and a grating pair are put into practical use.

A repetitive frequency R of this ultrashort wave pulse laser light source is determined based upon a resonator length L. In the standing-wave type ultrashort wave pulse laser light source, the repetitive frequency is given by an equation of R=c/2L (c=light velocity), and in the traveling-wave type ultrashort wave pulse laser light source (for example, in the case of a ring-type light path), the repetitive frequency is given by an equation of R=c/L.

An example in which an oscillator with a high repetitive frequency of 2 GHz is put into practical use has been reported as an example of the aforementioned ultrashort wave pulse laser light source. When it is intended to obtain a repetitive frequency of 2 GHz, for example, in the case of the ring type, the resonator length L becomes 15 cm (see Spectroscopical Society of Japan, Measurement Method Series, "SUPER-RESOLUTION OPTICS" edited by Satoshi Kawata, published by Society Publishing Center Corporation, Mar. 20, 1999, page 79, for example).

This Ti:Sapphire ultrashort wave pulse laser light source is excited by a semiconductor laser excitation high output green laser, oscillated at a center wavelength ranging from 760 nm to 840 nm, for example, 800 nm, and can produce an output in which an average output is 1 W and a pulse width (FWHM: Full Width at Half Maximum, full width at half maximum) is equal to or less than 100 fs ($100\times10^{-15}$), for example, 23 fs stably. The beam lateral mode is excellent in performance in which a noise is equal to or less than 0.1% in the TEM00. Further, ultrashort wave pulse laser light sources such as ones manufactured by Tsunami series manufactured by Spectra Physics Corporation and Mira series manufactured by Coherent Corporation in which a pulse width (FWHM) is equal to or less than 100 fs and an average output is higher than 1 W at a repetitive frequency of 80 MHz are put into practical use.

Also, such a technology has been reported in which a two-photon absorption process is generated by using such ultrashort wave pulse laser light source to thereby form patterns smaller than the diffraction limit based upon super-resolution characteristic using a nonlinear optical effect (see Spectroscopical Society of Japan, Measurement Method Series, "SUPER-RESOLUTION OPTICS" edited by Satoshi Kawata, published by Society Publishing Center Corporation, Mar. 20, 1999, page 79 and S. Kawata et al: "Fine features for functional microdevices", Nature 2001, Vol. 412, p. 697, for example).

The above-mentioned literatures have reported an example in which a dot-like pattern having a width of 120 nm is formed by using a laser with a repetitive frequency of 76 MHz and a pulse width of 100 fs and an objective lens with a numerical aperture NA of 1.4.

However, at present, a technology in which a modulation signal of recording information for use with an optical recording medium is formed on a resist by pattern-exposure using the two-photon absorption process, this resist being used to expose the optical recording medium master disc is not yet put into practical use.

In view of the aforesaid aspect, it is an object of the present invention to provide an optical recording medium master disc exposure apparatus and an optical recording medium exposure method in which miniscule pits can be formed at high accuracy and in which productivity can be improved considerably.

DISCLOSURE OF THE INVENTION

According to the prevent invention, there is provided an optical recording medium master disc exposure apparatus including modulating means for modulating intensity of light from an exposure light source in response to recording information and a focusing optical system for focusing light modulated by this modulating means on a photoresist on an optical recording medium master disc to pattern-expose the photoresist in response to recording information. The exposure light source comprises a ultrashort wave pulse laser having a repetitive frequency of an integral multiple in a range of one time to 20 times as high as the clock frequency of recording information, and this optical recording medium master disc exposure apparatus includes an external synchronization mechanism for making a resonator length of this ultrashort wave pulse laser becoming variable and mode-locking the repetitive frequency of the ultrashort wave pulse laser in response to the clock frequency of recording information to thereby pulse-oscillate the repetitive frequency.

Also, according to the present invention, the above-mentioned optical recording medium master disc exposure apparatus includes between the exposure light source and the modulating means a higher order higher harmonic wave generating means for emitting light converted as a ultrashort wave light by wavelength-conversion using a nonlinear optical element in the condition in which the ulrashort wave pulse laser light source is used as an excitation light source.

Further, according to the present invention, there is provided an optical recording medium master disc exposure method comprising the steps of modulating intensity of light from an exposure light source in response to recording information and focusing light modulated by this modulating means on a photoresist on an optical recording medium master disc to pattern-expose the photoresist in response to recording information. The exposure light source comprises a ultrashort wave pulse laser having a repetitive frequency of an integral multiple in a range from one time to 20 times as high as the clock frequency of recording information. There is provided an external synchronization mechanism for making a resonator length of this ultrashort wave pulse laser becoming variable and mode-locking the repetitive frequency of the ultrashort wave pulse laser in synchronism with the clock frequency to pulse-oscillate the repetitive frequency.

Also, according to the present invention, there is provided an optical recording medium master disc exposure apparatus including a modulating means for modulating intensity of light from an exposure light source in response to recording information and a focusing optical system for focusing light modulated by this modulating means on a photoresist on an optical recording medium master disc to pattern-expose the photoresist in response to recording information. In this optical recording medium master disc exposure apparatus, the exposure light source is comprised of a ultrashort wave pulse laser having a repetitive frequency in a range from 10 times to 20 times as high as the clock frequency of recording information.

Further, according to the present invention, the above-mentioned arrangement has between the exposure light source and the modulating means a higher order higher harmonic wave generating means for emitting light converted as ultrashort wave light converted by wavelength-conversion using a nonlinear optical element in the condition in which the ultrashort wave pulse laser light source is used as an excitation light source.

Also, according to the present invention, there is provided an optical recording medium master disc exposure method comprising the steps of modulating intensity of light from an exposure light source in response to recording information and focusing light modulated by the modulating means on a photoresist on an optical recording medium master disc to pattern-expose the photoresist in response to recording information. The exposure light source is comprised of a ultrashort wave pulse laser having a repetitive frequency in a range from 10 times to 20 times as high as the clock frequency of recording information.

Further, according to the present invention, in the above-mentioned respective optical recording medium master disc exposure methods, light emitted from the exposure light source is converted into ultrashort wave light and emitted by wavelength-conversion using a nonlinear optical element with a higher order higher harmonic wave generating means using this exposure light source as an excitation light source.

As described above, according to an aspect of the present invention, the present invention uses the ultrashort wave pulse laser light source as the exposure light source and includes an external synchronization mechanism for making the repetitive frequency of the ultrashort wave pulse laser becoming a frequency of an integral multiple in a range from one time to 20 times as high as the clock frequency of recording information and making a resonator length of this ultrashort wave pulse laser become variable.

A clock frequency of a recording information signal of an optical disc is 4.3 MHz in the case of a CD, 26 MHz in the case of a DVD, and 66 MHz in the case of a so-called Blu-ray Disc receiving a remarkable attention as a high-density disc in recent years and which is now under development in which reproducing light has a wavelength $\lambda$ of 405 nm and in which an objective lens has a numerical aperture NA of 0.85. Since the clock frequency of the Blue-ray Disc, for example, is 66 MHz, it is substantially the same as the repetitive frequency of the ultrashort wave pulse laser so that an information data signal and a laser pulse oscillation should be matched with each other in timing.

The present invention includes the external synchronization mechanism for adjusting the resonator length of the ultrashort wave laser light source that is used as the exposure light source. This external synchronization mechanism adjusts the resonator length in such a manner that the repetitive frequency may become an integral multiple in a range from one time to 20 times as high as the channel clock, that is, one time, two times, three times . . . 20 times as high as the channel clock.

Since the repetitive frequency is synchronized with the channel clock as described above, light from the ultrashort wave pulse laser light source is used as the exposure light source to pattern-expose the photoresist in synchronism with an information signal recorded on a wide variety of optical recoding mediums such as a CD, a DVD and a Blu-ray Disc reliably.

On the other hand, according to another aspect of the present invention, the ultrashort wave pulse laser light source is used as the exposure light source of the optical recording medium master disc exposure apparatus, and its frequency is the repetitive frequency in a range from 10 times to 20 times as high as the clock frequency of recording information.

The clock frequency of the recording information signal of the optical recording medium is 4.3 MHz in the case of the CD, 26 MHz in the case of the DVD and 66 MHz in the case of the Blu-ray Disc as described above. If ultrashort wave pulse laser light that is oscillated at a high repetitive frequency equal to or more than 10 times as high as these frequencies is used, then when an information signal is recorded on the optical recording medium, a pulse interval can be sufficiently reduced as compared with a signal interval so that respective pulses are averaged by an integration, and a displacement of a pattern such as a pit signal can be controlled without affecting a reproduced signal. Hence, the above-mentioned ultrashort wave pulse laser light can be treated similarly to continuous oscillation light of the prior art, and a jitter value of a signal obtained upon reproduction can be decreased to be equal to or less than 10%.

In this case, the pulse laser light and the clock signal of the recording information and the like need not be synchronized with each other by the external synchronization mechanism, and hence the arrangement of the apparatus can be avoided from becoming complex.

At that time, when the repetitive frequency is selected to be less than 20 times the channel clock, a peak output of the ultrashort wave pulse laser light can be held at an output high enough to fine pattern-expose the photoresist and hence the photoresist can be fine pattern-exposed at high accuracy as compared with the prior art.

Referring to the Blu-ray Disc of which frequency is highest in the above-mentioned optical recording mediums by way of example, it is sufficient to use a ultrashort wave pulse laser that is oscillated at a repetitive frequency higher than 66×10=660 MHz.

That is, when the repetitive frequency is higher than 10 times the clock frequency as described above, since the ultrashort wave pulse laser is oscillated at the very high repetitive frequency, there is then the advantage that it becomes possible to expose the photoresist without adjusting the timings of the ultrashort wave pulse laser and an optical modulator of an information recording signal at high accuracy similarly to the prior-art method using the continuous oscillation laser light.

When the clock frequency of the optical recording medium becomes higher than that of the above-mentioned Blu-ray Disc, if the repetitive frequency of the ultrashort wave pulse laser is selected to be equal to or higher than 10 times the channel clock, there is then the risk that a sufficient peak output will not be obtained. If the peak output is not sufficient, then a two-photon absorption process, which will be described later on, becomes difficult to occur. There is then the risk that it becomes difficult to expose the photoresit with a target miniscule spot diameter.

In this case, as mentioned hereinbefore, it is desirable that there is provided the external synchronization mechanism by which the repetitive frequency of the ultrashort wave pulse laser should be made an integral multiple in a range from one time to 10 times as high as the clock frequency of the optical recording medium and hence it should be synchronized with the clock signal.

In the respective aspects of the above-mentioned present invention, the higher order higher harmonic wave generating means is provided between the exposure light source and the modulating means and the ultrashort wave pulse laser light source is used as the excitation light source to emit the light of which wavelength was reduced by wavelength-conversion using the nonlinear optical element, whereby an exposure light source with a shorter wavelength can be obtained.

As described above, according to the optical recording medium master disc exposure apparatus and the optical recording medium master disc exposure method of the present invention, the light from the exposure light source which emits the ultrashort wave pulse laser light with the high repetitive frequency that can be regarded as substantially the same as quasi-continuous light or the ultrashort wave pulse laser light of which wavelength was reduced by the higher order higher harmonic wave generating means using the exposure light source as the excitation means is emitted, the light modulated by the light intensity modulating means is focused at a spot size of a diffraction limit by a predetermined focusing optical system and irradiated on the photoresist, whereby uneven patterns such as pits with a pattern very much smaller than that of the prior art can be exposed.

Further, according to the present invention, in the above-mentioned optical recording medium master disc exposure apparatus or the above-mentioned optical recording medium master disc exposure method, the photoresist is exposed by the two-photon absorption process. When the ultrashort wave pulse laser light source of which peak output is very high is used as the exposure light source and a beam is focused by the focusing optical system, the two-photon absorption process can occur very efficiently within the resist. For example, when the repetitive frequency is 1 GHz and average energy of laser light obtained after it has passed through the objective lens is 10 mW, intensity of light within the beam spot on the surface of the photoresist reaches 100 GW/cm$^2$ in peak output.

The two-photon absorption process is one of nonlinear optical phenomena, and light for exposing the resist is given by the square of intensity distribution of a beam spot. A two-photon absorption cross-section of the resist is a small value of about $10^{-46}$ to $10^{-47}$ cm$^4$s/photon and absorption of several percents occurs although sensitivity of the resist is low.

In order to cause the two-photon absorption to occur at high efficiency as described above, the peak output of the ultrashort wave pulse laser light should be high.

In the present invention, while the pulse oscillation with the high repetitive frequency is used and its pulse width (FWHM) is selected to be equal to or less than at least 1 ps ($1\times10^{-12}$ second), when the pulse width was regulated as described above, the two-photon absorption could occur highly efficiently.

In the resist exposure process, a light absorption distribution of a light source within the resist plane is in proportion to a beam intensity distribution in the case of ordinary absorption and is in proportion to the square of a beam intensity distribution in the case of two-photon absorption. FIG. 5 shows a light absorption distribution. In FIG. 5, I denotes a beam intensity distribution and is equivalent to the case of the ordinary absorption. $I^2$ denotes the square of the beam intensity distribution and corresponds to the case of the two-photon absorption. An Airy spot diameter d is given as:

$$d=1.22\lambda/NA$$

While the spot size is 0.36 μm when the numerical aperture NA of the objective lens is given as NA=0.9 and the wavelength $\lambda$=267 nm is satisfied, in the case of the two-photon absorption, the spot size corresponds to a beam spot of substantially $1/\sqrt{2}$=0.7 time, that is, the beam spot size obtained in the ordinary exposure using an exposure light source having a wavelength of 190 nm. Thus, a recording linear density becomes approximately 1.4 times as high as the case of exposure using one photon (in the case of ordinary exposure).

Also, according to the present invention, in the above-mentioned respective optical recording medium master disc exposure apparatus and optical recording medium master disc exposure method, the spot shape of laser light focused on the photoresist after it has been emitted from the focusing optical system is selected to be an oblong shape which is extended in the scanning direction of laser light.

When linear patterns such as grooves are to be exposed, a pulse interval (reciprocal number of repetitive frequency) and a scanning speed (linear velocity required in the case of a disc-like optical recording medium master disc) should be optimized in accordance with sensitivity of the resist. However, since the pulse interval is uniquely fixed by the channel clock, it is difficult to expose linear patterns.

According to the above-mentioned present invention, because the beam spot of light beam focused on the resist after it has been emitted from the focusing optical system is oblong in the beam scanning direction, a light amount distribution of irradiated light is spread and averaged, whereby the linear patterns such as the grooves can be obtained with ease.

Furthermore, according to the present invention, the absorption peak wavelength of the photoresist is selected to be less than half of the wavelength of the exposure light source.

As described above, ordinary absorption (one-photon absorption) can be controlled efficiently by using a material that is transparent in the wavelength region of the exposure light source and which can absorb light in the half wavelength of the above wavelength as the photoresist.

In the two-photon absorption, two photons are absorbed at the same time and electrons of the resist are transited to the higher level twice as large as the energy of one photon. From an absorption spectrum standpoint, since the exposure light source is excited by light (one photon) having a wavelength half of that of the exposure light source, when the absorption peak wavelength is selected to be half of the wavelength of the exposure light source, the resist for use in two-photon absorption can cause two-photon absorption to occur efficiently, and hence more miniscule patterns can be exposed.

As described above, according to the present invention, since the ultrashort wave pulse laser is used as the exposure light source and the light beam is focused up to the diffraction limit by the focusing optical system, the two-photon absorption can be carried out highly efficiently and exposure of the resist can be given by the two-photon absorption process in the form of the square of the intensity distribution of the beam spot and hence it has a super-resolution characteristic using a nonlinear effect. As a result, it becomes possible to record miniscule pits very smaller than the diffraction limit.

DETAILED DESCRIPTION OF THE PRESENTLY PREFERRED EMBODIMENTS

An optical disc master disc exposure apparatus according to an embodiment of the present invention will be described below with reference to the drawings.

Figure 1:
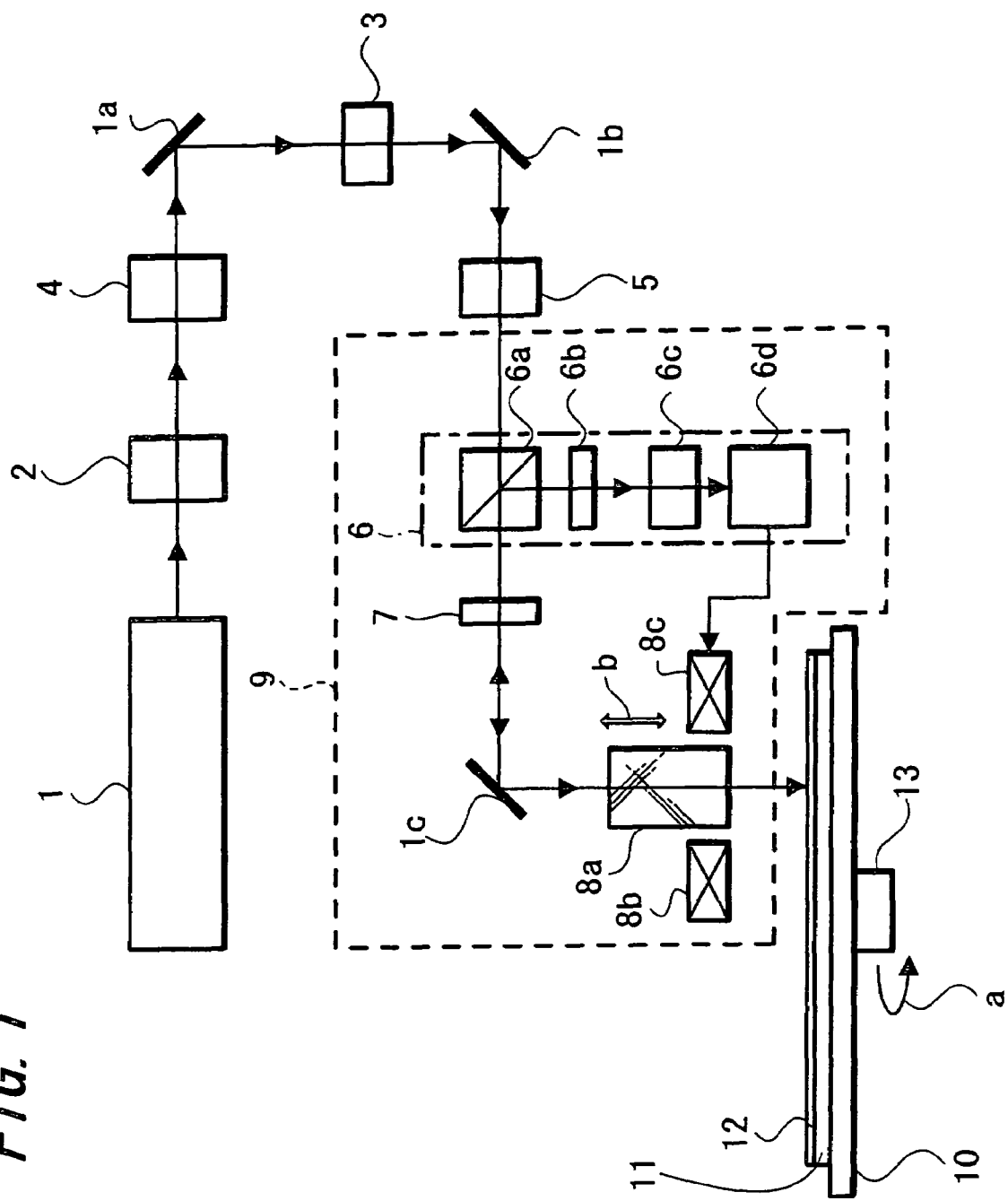
FIG. 1 is a schematic diagram showing an arrangement of an optical recording medium master disc exposure apparatus according to an embodiment of the present invention.

FIG. 1 is a schematic diagram showing an arrangement of an optical recording medium master disc exposure apparatus according to an embodiment of the present invention. In this embodiment, this exposure apparatus is composed of a modulating means 3 for modulating intensity of light from an exposure light source 1 in response to recording information and a focusing optical system 9 for focusing light modulated by this modulating means 3 onto a photoresist 12 on a disc-like optical recording medium master disc 11 to thereby pattern-expose the photoresist 12 in response to recording information.

As shown in FIG. 1, pulse laser light emitted from the exposure light source 1 is reflected by a mirror 1a through a higher order higher harmonic wave generating means 2, which will be described in detail in the later stage, and a chirp correction optical system 4, reflected by a mirror 1b through the modulating means 3 and introduced through a beam expander 5 into the focusing optical system 9. In this focusing optical system 9, laser light is traveled from an auto focus optical system of which one example will be described in detail in the embodiment of the later stage through a quarter-wave plate 7, reflected by a mirror 1c and irradiate through an objective lens 8a distance of which from the optical recording medium master disc 11 is adjusted at high accuracy by electromagnetic actuators 8b and 8c onto the predetermined recording track position, for example, on the optical recording medium master disc 11. Also, the optical recording medium master disc 11 is fixed to a turntable 10. In this embodiment, the turntable 10 is rotated by a rotation means 14 as shown by an arrow and the focusing optical system 9 is located over a moving optical table, not shown, for example, whereby the focusing optical system is moved in the radius direction of the optical recording medium master disc 11 to thereby irradiate exposure light over the whole surface of the optical recording medium master disc.

Then, in the present invention, the exposure light source 1 is comprised of a ultrashort wave pulse laser with a repetitive frequency of an integral multiple in a range from one time to 20 times as high as the clock frequency of recording information.

Figure 2A:
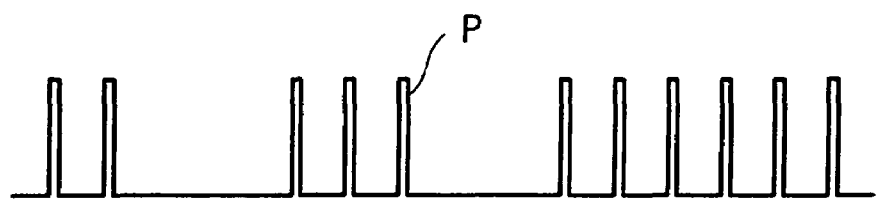
FIG. 2A is a diagram used to explain an example of a pulse waveform of ultrashort pulse laser light.
Figure 2B:
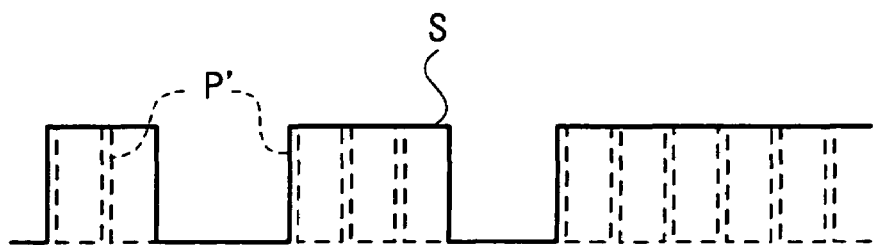
FIG. 2B is a diagram used to explain a waveform of an information signal and an example of a pulse waveform of ultrashort pulse laser light.

A schematic waveform of a pulse signal from this ultrashort wave pulse laser light source is illustrated in FIG. 2A, and a schematic waveform in the state in which the pulse signal is superimposed upon a signal waveform S of recording information by the above-mentioned modulating means 3 is illustrated in FIG. 2B. By selecting the interval of a pulse P properly as shown in FIG. 2A, its frequency is superimposed upon the recording information signal S as shown in FIG. 2B, as a frequency of an integral multiple in a range from one time to 20 times of a clock signal C of recording information, in the illustrated example, as a frequency one time as high as the clock signal. In FIG. 2B, a pulse waveform is shown by dashed line P'. Thus, exposure synchronized with the recording information is made to pattern-expose the photoresist in response to recording information.

Figure 3:
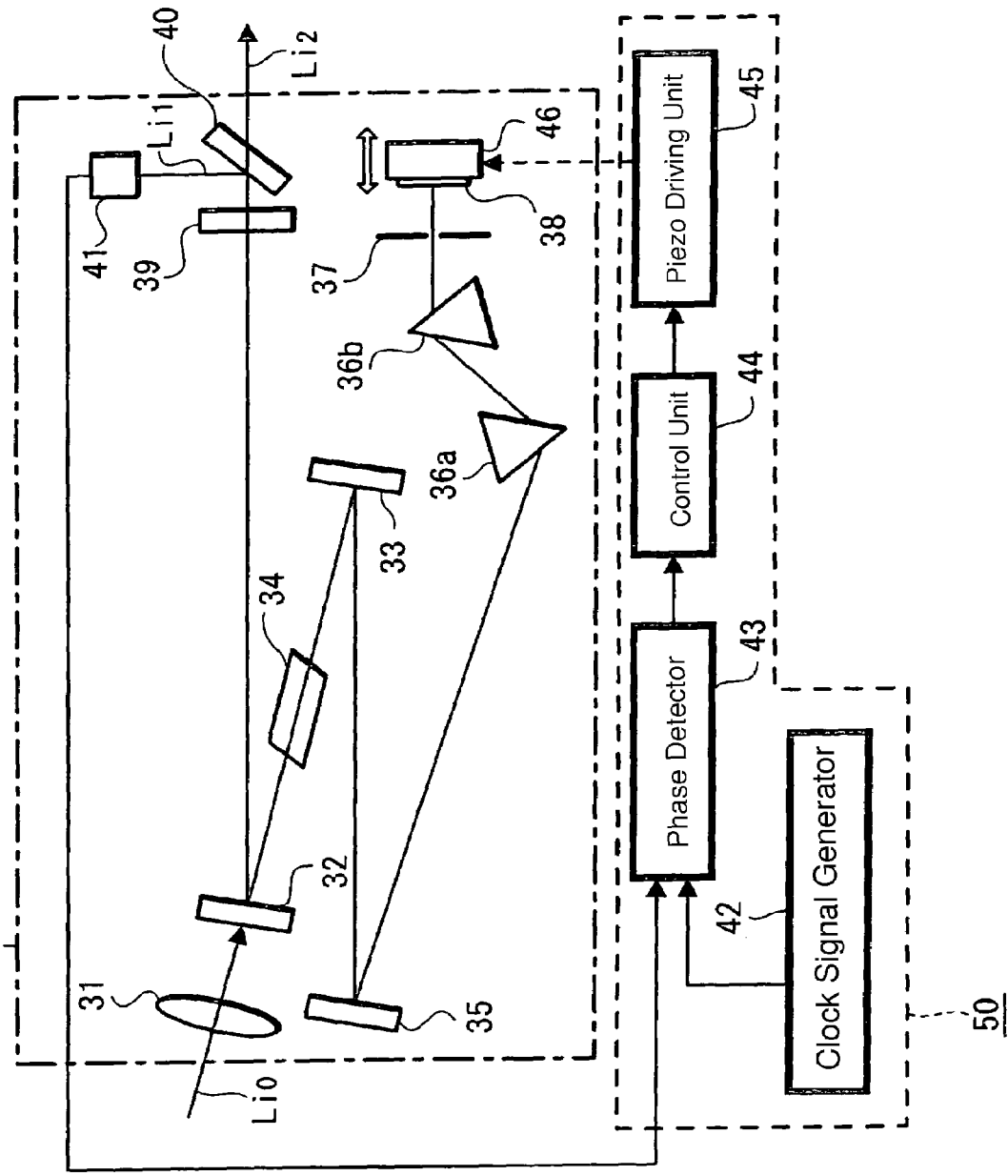
FIG. 3 is a diagram useful for explaining an external synchronization mechanism.

In order to match the repetitive frequency of the ultrashort wave pulse laser of the exposure light source with the integral multiple of the clock frequency of the recording information, according to the present invention, there is provided an external synchronization mechanism shown in FIG. 3, for example. In FIG. 3, reference numeral 30 denotes a ultrashort wave pulse laser light source using a Ti:Sapphire and reference numeral 50 denotes an external synchronization mechanism.

First, in the ultrashort wave pulse laser light source 30, excited light Li0 from a suitable means such as a semiconductor laser (not shown) is introduced through a lens 31 and a spherical mirror 32 into a laser medium 34 such as a Ti:sapphire. Further, this excited light is reflected by a high reflection mirror 35 and then introduced into dispersion compensation prisms 36a and 36b. Then, the excited light is reflected by a high reflection mirror 38 through a slit 37. Then, the excited light is again passed through the slit 37 and returned through the dispersion compensation prisms 36b and 36a, the high reflection mirror 35 and the spherical mirror 33 back to the laser medium 34. As exposure light, light returned from the laser medium 34 to the spherical mirror 32 is outputted to the outside through an output window (output coupler) 39 and a beam splitter 40 as emitted light Li2.

Then, in the present invention, the beam splitter 40 uses a photo-detector 41 made of a photo-diode and the like to detect part of outputted light. Then, the output from this photo-detector 41, that is, an electric signal based upon the laser pulse oscillation, and an output, to be recorded on the optical recording medium, from a clock signal generator 42 in an information signal output apparatus are compared with each other in phase by a phase detector 43. When the repetitive frequency is selected to be an integral multiple higher than twice the clock signal, the output from the photo-detector is compared with the clock signal having a frequency of an integral multiple of the signal from the clock signal generator 42 in phase. Then, the signal outputted from the phase detector 43 is inputted into a control unit 44 composed of a suitable means such as a PLL (Phase Lock Loop) circuit, whereby a control signal converted into a predetermined control amount is inputted into a piezo-driving unit 45 to fine move a piezo-element 46 fixed to the aforementioned high reflection mirror 38 in the optical axis direction, thereby making it possible to fine adjust a resonator length of a laser resonator. The resonator length in this embodiment becomes identical to a length of a light path from the spherical mirror 32 to the high reflection mirror 38.

With this arrangement, a jitter produced between the clock signal of the recording information and the oscillation pulse of laser can be made equal to or less than 1 ps.

Then, because the optical modulator drive signal of the information recording signal also is transmitted in synchronism with the clock signal, it can be matched with the pulse oscillation of the ultrashort wave pulse laser in timing. When the repetitive frequency of the ultrashort wave pulse laser light source is selected to be one time as high as the clock signal, that is, synchronized with the clock signal, if information is recorded on the photoresist by using a (1, 7) modulation code, for example, then 2 pulses are irradiated on a 2T shortest pit. If the repetitive frequency is externally synchronized with the frequency twice as high as the clock signal, that is, 132 MHz in the case of the aforementioned Blu-ray Disc, then the optical system may be located within the ultrashort wave pulse laser device such that a resonator length R may be selected so as to satisfy $R=c/2L=1136$ mm (reference letter c denotes a light velocity). As a result, 4 pulses may be irradiated on the 2T shortest pit.

When the repetitive frequency of the ultrashort wave pulse laser is selected to be higher to 10 times the clock frequency, the jitter can be controlled so as to fall within 10% as mentioned hereinbefore so that the repetitive frequency need not be selected to be an integral multiple of the clock frequency by the external synchronization mechanism. It is needless to say that the repetitive frequency may be selected to be an integral multiple of the clock frequency by the external synchronization mechanism in order to more reliably control the jitter.

Depending upon an output from a ultrashort wave pulse laser used herein, in order to obtain a peak output value required to cause a multiple-photon absorption such as a two-photon absorption to occur, it is desired that the repetitive frequency should be selected to be an integral multiple equal to or less than 8 times as high as the clock frequency.

In particular, when the present invention is applied to the above-mentioned Blu-ray Disc or an optical recording medium having a clock frequency higher than the above clock frequency, it is desirable that the repetitive frequency should be selected to be an integral multiple equal to or less than four times as high as the clock frequency.

Further, when the repetitive frequency is selected to be an integral multiple in a range from one to four times as high as the clock frequency, if there is the risk that the number of pulses within one recorded mark is reduced to cause a jitter to occur, a square waveform is not recorded as shown in FIG. 2B but so-called recording compensation for partly adjusting the laser output within one recorded mark is adjusted so that a distribution of an integrated value of a light amount may be fine adjusted. As a result, the shape of the formed pit can be corrected and hence decrease of a timing jitter and the like can be controlled.

According to another aspect of the present invention, in the above-mentioned optical recording medium master disc exposure apparatus shown in FIG. 1, the exposure apparatus 1 is composed of a ultrashort wave pulse laser having a repetitive frequency in a range from 10 times to 20 times as high as the clock frequency of recording information.

Figure 2C:
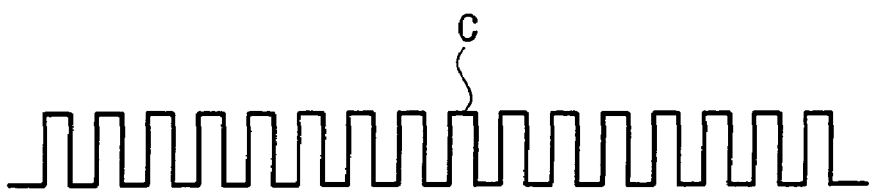
FIG. 2C is a diagram used to explain an example of a pulse waveform of a clock signal.
Figure 4A:
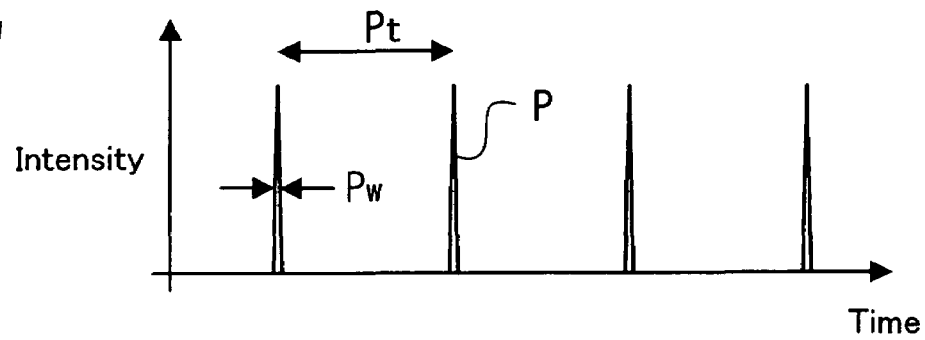
FIG. 4A is a diagram used to explain an example of a pulse waveform of ultrashort wave pulse laser light.
Figure 4B:
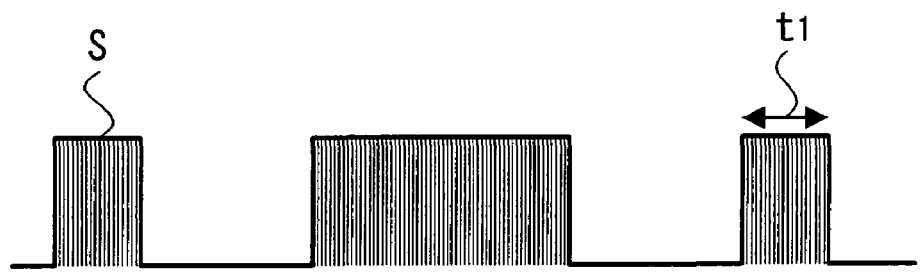
FIG. 4B is a diagram used to explain a waveform of an information signal and an example of a pulse waveform of ultrashort wave pulse laser light.

A schematic waveform of a pulse signal from this ultrashort wave pulse laser light source is shown in FIG. 4A, and a schematic waveform in which the pulse signal is superimposed on the signal waveform S of the recording information by the above-mentioned modulating means 3 is shown in FIG. 4B. As shown in FIG. 4A, an interval pt of a pulse p is selected properly to provide a frequency 10 times higher than the recording information clock signal C shown in FIG. 2C, thereby being superimposed upon the recording information signal as shown in FIG. 4B. In consequence, the photoresist is exposed by quasi-continuous light, and hence the photoresist can be pattern-exposed in response to the recording information. In FIG. 4A, reference letter pw denotes a pulse width.

Since the peak output of the pulse is lowered regardless of the average output as the repetitive frequency of the laser oscillator is increasing, efficiency in which the higher order higher harmonic wave is generated in the later stage and the two-photon absorption efficiency of the resist is lowered so that the repetitive frequency of the ultrashort wave pulse laser light source is selected to be equal to or less than 20 times as high as the frequency of the clock signal.

Also, in the present invention, according to the above-mentioned arrangement, the exposure light source 1 and the modulating means 3 have therebetween provided the higher order higher harmonic wave generating means 2 for emitting light of which wavelength is reduced by wavelength conversion using the nonlinear optical element in which the ultrashort wave pulse laser light source is used as the excitation light source as shown in FIG. 1.

Figure 5:
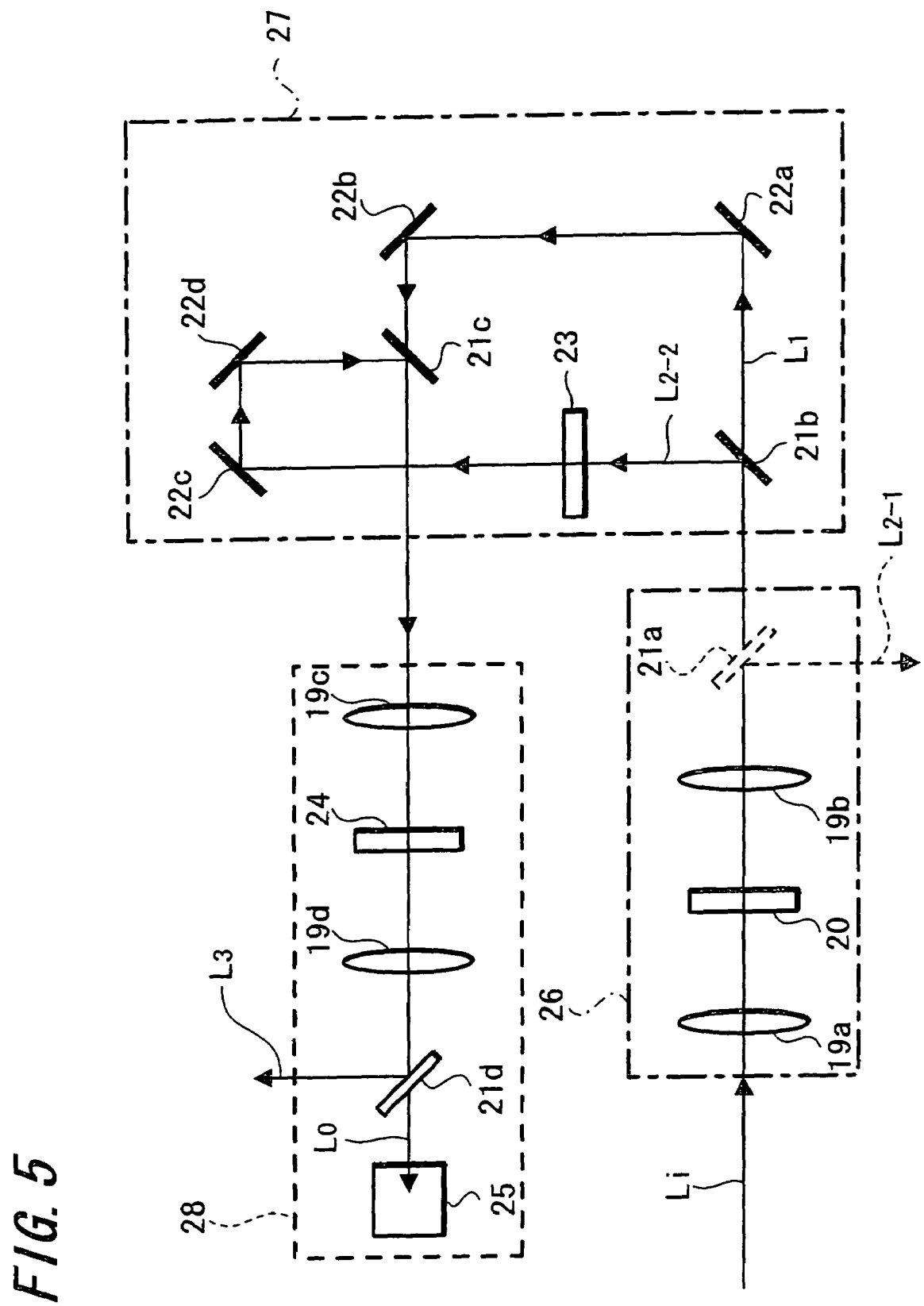
FIG. 5 is a schematic diagram showing an arrangement of an example of a higher order higher harmonic wave generating means.
Figure 6:
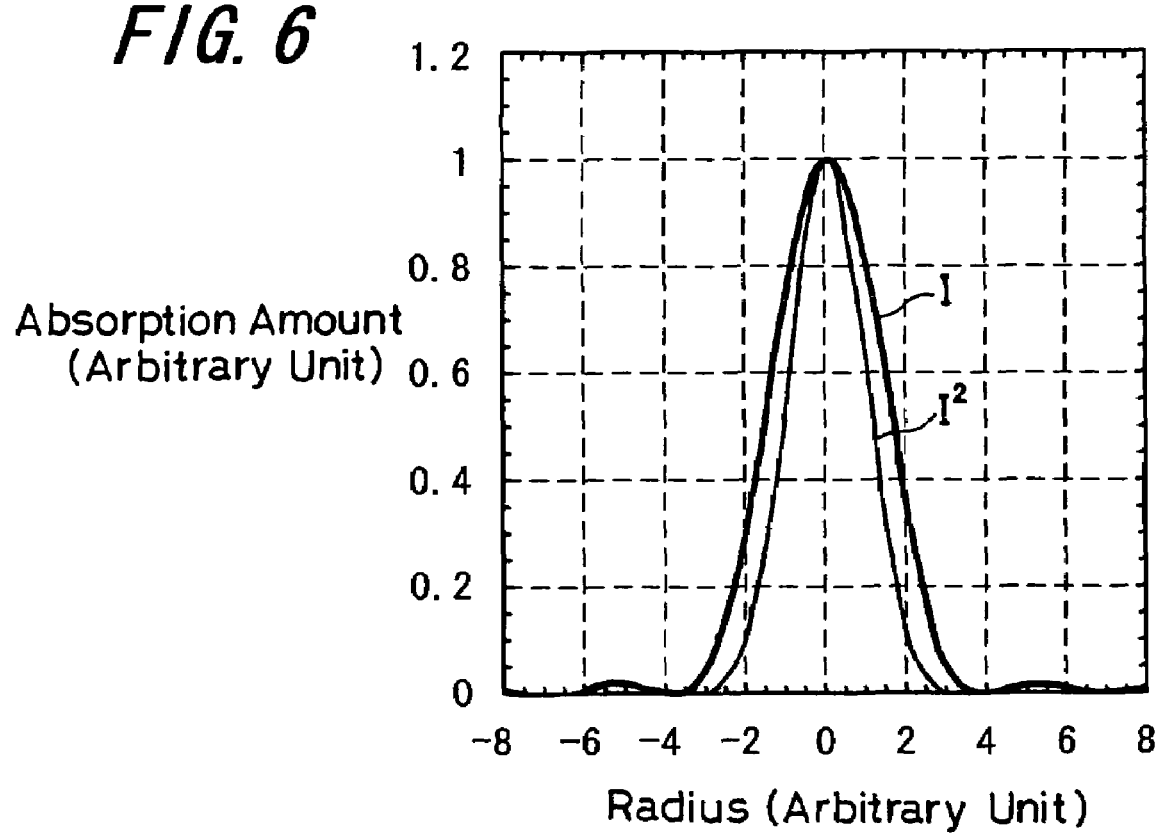
FIG. 6 is a diagram showing an absorption amount of an Airy spot in a photoresist.

A schematic arrangement of an example of this higher order higher harmonic wave generating means 2 is illustrated in FIG. 5.

In FIG. 5, reference numeral 26 denotes a second higher harmonic wave (SHG) generating unit, reference numeral 27 denotes a delay line unit and reference numeral 28 denotes a third higher harmonic wave (THG) generating unit, respectively. A light Li that became incident on the second higher harmonic wave generating unit 26 is introduced through a focusing lens 19a into a nonlinear optical crystal 20, whereafter it is reflected by a harmonic separator 21a through a focusing lens 19b and thereby produced as light $L_{2-1}$ or introduced into the delay line unit 27 if the harmonic separator 21a is not provided.

The harmonic separator 21b separates the light incident on the delay line unit 27 to provide a fundamental wave L1 and a second higher harmonic wave $L_{2-2}$. The fundamental wave is reflected by the mirrors 22a, 22b and thereby introduced into the third higher harmonic wave generating unit 28, and the second higher harmonic wave $L_{2-2}$ is reflected by the mirrors 22c, 22d, 21c through the half-wave plate 23 and thereby introduced into the third higher harmonic wave generating unit 28.

As is disclosed in "F. Rotermund, et al: "Generation of the fourth harmonic of a femtosecond Ti:Sapphire laser" Optics Letters, Jul. 1, 1998, Vol. 23, No. 13, p 1040, for example, with the use of the aforementioned Ti:Sapphire ultrashort wave pulse laser (repetitive frequency is 82 MHz, pulse width is 85 fs and average output is 1.9 W) having the center wavelength of 800 nm and a second higher harmonic wave generating (SHG) apparatus using a type I critical phase matching of a nonlinear optical crystal $LiB_3O_5$ (LBO), it is possible to obtain ultrashort wave pulse laser light with a center wavelength of 400 nm and whose pulse width of 100 fs and average output is 600 mW, for example, although the pulse width is slightly spread by a group velocity dispersion.

When the type I phase matching is used in the second higher harmonic wave generation, since planes of polarizations of the fundamental wave and the second higher harmonic wave are rotated 90°, as FIG. 5 shows an example thereof, the plane of polarization of the second higher harmonic wave $L_{2-2}$ can be matched with that of the fundamental wave by providing the half-wave plate 23 for matching the phase of the second higher harmonic wave with that of the fundamental wave L1 before it is introduced into the second nonlinear optical crystal 24 for use with the type I phase matching.

In addition, since the second higher harmonic wave $L_{2-2}$ is emitted after the fundamental wave L1 has been emitted due to wavelength dispersion within the first nonlinear optical crystal 20, the fundamental wave L1 is delayed by the above-mentioned delay line unit 27 before it is being introduced into the second nonlinear optical crystal 24. The delay means is realized by synthesizing the fundamental wave and the second higher harmonic wave when the optical path length of the fundamental wave L1 is extended only a length corresponding to the delay time after the fundamental wave and the higher harmonic wave have been separated by the harmonic separator 21b (see C. Rulliere ed. "Femtosecond Laser Pulses", Springer, p. 170).

Then, as shown in FIG. 5, in the third higher harmonic wave generating unit 28, the synthesized wave is introduced into the nonlinear optical crystal 24 and a third higher harmonic wave L3 is emitted to the outside by mixing sum signals. Reference numerals 19c and 19d denote condenser lenses, reference numeral 21d denotes a mirror, reference numeral 25 denotes a beam stopper and reference letter Lo denotes undesired light.

The respective lenses 19a to 19d are located in order to increase intensity of light beam within the crystal and in order to improve conversion efficiency.

Since the peak output of the ultrashort wave pulse laser light is very high and the conversion efficiency of the second higher harmonic wave generation which is the second order nonlinear optical phenomenon increases in proportion to intensity of laser, high efficiency can be obtained by a single path, that is, optical path setting in which light passes through the nonlinear optical crystal once. However, in the case of the higher order higher harmonic wave generation using a ultrashort wave pulse laser with a pulse width of equal to or less than 100 fs, for example, due to the group velocity dispersion of the nonlinear optical crystal, if the crystal is thick, then group velocity mismatching occurs, and hence effective wavelength conversion is not carried out. The crystal length of LBO, for example, should be selected to be equal to or less than 1.5 mm when a pulse width is 100 fs and a center wavelength is 800 nm.

Further, the above-mentioned third higher harmonic wave generating unit 28 can generate ultrashort wave pulse laser light with a center wavelength of 267 nm, a pulse width of 115 fs and an average output of about 100 mW by sum frequency mixture (SFM) of the fundamental wave with the center wavelength of 800 nm, for example, and the second higher harmonic wave with the center wavelength of 400 nm, for example, emitted from the above-mentioned higher order higher harmonic wave generating means. This sum frequency mixture is a second order nonlinear optical phenomenon similarly to the second higher harmonic wave generation and can use the type I critical phase matching of a nonlinear optical crystal BBO, for example. The length of the crystal should be selected to be equal to or less than 0.4 mm due to the above-mentioned reasons.

A four order higher harmonic wave generation is made possible by adding the nonlinear optical crystal (BBO) for use in sum frequency mixture, and hence a light source with a wavelength 204 nm can be obtained. There can be obtained a pulse width of 340 fs and an average output of 15 mW. Accordingly, from a wavelength standpoint, light up to the four order higher harmonic wave can be used with sufficient average output power as the exposure light source applied to the optical recording medium master disc exposure apparatus and the optical recording medium master disc exposure method of the present invention.

As described above, according to the present invention, when the pulse oscillation with high repetitive frequency is used, its pulse width (FWHM) is selected to be at least less than 1 ps ($1 \times 10^{-12}$ second), and the two-photon absorption can efficiently be caused by regulating the pulse width.

In the present invention, the following effects can be achieved by selecting the absorption peak wavelength of the photoresist to be less than half of the wavelength of the exposure light source.

That is, ordinary absorption can efficiently be controlled by using a material that is transparent in the wavelength region of the exposure light source and which has absorption in the half wavelength as the photoresist.

Further, when the photoresist is exposed over the entire thickness, it is desirable that the half wavelength of the exposure light source should exist on the side of wavelength slightly longer than the absorption peak of the photoresist.

When a master disc for a suitable optical recording medium such as a CD wherein the thickness of the photoresist is selected to be approximately 100 nm, for example, is exposed, if an exposure light source and a photoresist whose absorption coefficient is approximately several percents relative to the absorption coefficient in the absorption peak wavelength are selected, then two-photo absorption is not caused only near the surface of the resist and absorption can be caused over the whole thickness. In the case of the master disc for an optical recording medium such as a Blu-ray Disc in which a photoresist has a thickness of about 40 nm, if the exposure light source and the photoresist having an absorption coefficient of about 10% are selected, then absorption can occur over the whole thickness of the resist similarly, and it becomes possible to pattern-expose the photoresist by which the surface of a master disc substrate can be exposed after development.

The following points should be noticed regardless of any of the light sources. That is, a band width (FWHM) $\sigma\lambda$ of ultrashort wave pulse laser light is calculated as $\sigma\lambda \cdot \sigma t = 0.315 \cdot \lambda^2/c$ (c: light velocity) and is thereby given as $\sigma\lambda = 6.7$ nm when a pulse width $\sigma t$ is 100 fs and is a $\text{sech}^2$ type Fourier transform limit pulse. Accordingly, when a high NA lens with an NA equal to or greater than 0.5 is in use, an achromatic lens, for example, is used as an objective lens, for example, an apochromate lens for use with a microscope and the like should be used. Also, since chromatic aberration occurs only in the refractive system, the above-mentioned problem can be avoided by using a focusing optical system that uses an aspherical concave mirror.

In addition, according to the present invention, the beam spot focused on the resist after it has been emitted from the focusing optical system is converted into the oblong beam spot in the beam scanning direction. As a result, a distribution of irradiated light amount is spread and averaged so that the linear patterns such as the grooves can be obtained easily.

In order to make the beam spot become the oblong beam spot, the beam expander 5 that has been described with reference to FIG. 1, for example, is of an anamorphic optical system, that is, a system by which a beam diameter in the vertical direction can be spread much more with respect to the beam scanning direction.

More specifically, it is desirable that a ratio of a beam enlargement rate should be increased to be several times by using a cylindrical lens, a cylindrical concave mirror, an anamorphic prism and the like.

As the aforementioned modulation means for modulating intensity of light that has been described with reference to FIG. 1, there can be suitably used an acousto modulation element using an acousto-optic effect in which light is Bragg-diffracted by ultrasonic waves within an acousto-optic element driven by a piezo-element modulated by a recording information signal or an electro-optic modulation element using a Pockels effect modulated by the recording information signal.

Since all optical elements such as the aforementioned lenses, wave plates and optical modulators have positive group velocity dispersions, even when laser light is adjusted such that its pulse width may be minimized at the time where it is emitted from the exposure light source, the ultrashort wave pulse laser light is constantly chirped and its pulse width is inevitably spread when it is irradiated on the photoresist of the optical recording medium master disc.

Accordingly, a chirp correction optical system having a negative group velocity should be used as the chirp correction optical system 4 shown in FIG. 1 to give a negative chirp to the ultrashort wave pulse light in advance after it has been emitted from the exposure light source to cancel the negative group velocity dispersion so that the shortest pulse may be obtained in the resist. As this chirp correction optical system 4, there can be used a dispersion prism pair, a grating pair and a chirp mirror.

Also, a pulse width required to adjust a pulse width can be measured by an auto-correlator using the conventional second higher harmonic wave generation method.

INVENTIVE EXAMPLE 1

Next, an example of an optical recording medium master disc exposure apparatus according to the present invention will be described with reference to FIG. 1. In this inventive example, the optical recording medium master disc exposure apparatus includes the exposure light source 1 composed of a Ti:Sapphire ultrashort wave pulse laser light source, the higher order higher harmonic wave generating means 2 using this ultrashort wave pulse laser as the excitation light source, the chirp correction optical system 4 having the negative group velocity dispersion to correct in advance the positive group velocity dispersion given when the pulse outputted from the above light passes a variety of optical assemblies, the modulating means 3 serving as the modulating means for modulating intensity of light by switching at high speed these light beams with the electrical pulse signal corresponding to the supplied data, the focusing optical system 9 for focusing the light modulated by the modulating means 3 to the spot size of the diffraction limit to irradiate the focused light onto the optical recording medium master disc 11 coated with the photoresist 12 and the beam expander 5.

As the ultrashort wave pulse laser light source, there was used the Ti:Sapphire laser having the repetitive frequency of 66 MHz which is the same as the clock frequency of the aforementioned Blu-ray Disc and whose center wavelength is 816 nm, pulse width is 80 fs and whose average output is 1.5 W, that is, the ultrashort wave pulse laser using the Ti:Sapphire as the laser medium 34 that has been described with reference to FIG. 2.

Then, the second higher harmonic wave with the wavelength of 408 nm or the third higher harmonic wave with the wavelength of 272 nm was generated from the aforementioned higher order higher harmonic wave generating means 3 that has been described with reference to FIG. 5. In this inventive example, as the nonlinear optical crystal 20 of the second higher harmonic wave generating unit 26 shown in FIG. 5, there was used the LBO crystal for carrying out the type I phase-matching. The type I BBO was used as the nonlinear optical crystal 24 of the third higher harmonic wave generating unit 28. Various lenses 19*a* to 19*d* are located in order to increase intensity of light beam within the crystal to thereby improve the conversion efficiency. The second higher harmonic wave light could be obtained as the emitted light with the average output of 600 mW and the pulse width (FWHM) of 100 fs, and the third higher harmonic wave light could be obtained as the emitted light with the average output of 120 mW and the pulse width of less than 1 ps.

As the chirp correction optical system 4, there was used a Brewster prism pair.

As shown in FIG. 1, the emitted light is reflected 90° by the mirror 1*a* and supplied to the modulating means 3. As the light intensity modulator of the modulating means 3, there was used an electro-optic element EOM with a signal modulation band of 80 MHz. This modulating means 3 is supplied with a bit recording signal from a so-called formatter in which data to be recorded on the optical recording medium master disc generates an electrical pulse signal though not shown. Light is modulated in response to this data.

This optically modulated light is reflected 90° by the mirror 1*b*, passed through the beam expander 5, a polarizing beam splitter (hereinafter referred to as a "PBS") 8*a*, for example, of the auto focus optical system 6 and the quarter-wave plate 7, reflected 90° by the mirror 1*c*, passed through the objective lens 8*a* with the high numerical aperture NA and is irradiated on the optical recording medium master disc 11 on which the photoresist 12 was coated in advance.

As the photoresist 12, there can be used an i-ray resist (manufactured by JSR Corporation under the trade name of "PFRIX1110G", etc.) and a Kr laser mastering resist (manufactured by Nippon Zeon Co. Ltd., under the trade name of "DVR-100", etc.).

At that time, the objective lens 8*a* uses a lens with a high numerical aperture NA value of which aberration was corrected to have a wavelength $\lambda$=267 nm to focus a light beam up to the diffraction limit so that the focused light may be irradiated on the photoresist. This objective lens 8*a* is comprised of an achromatic objective lens that is made of a material such as synthetic quarts and silica rock which can sufficiently pass light of this wavelength region. Also, the optical recording medium master disc 11 is fixed on the turntable 10 that is rotated in the direction shown by the arrow a by the rotation means 13 such as a spindle motor.

On the other hand, the higher order higher harmonic wave generating means 2 emits third higher harmonic wave light with a wavelength $\lambda$=272 nm and also emits second higher harmonic wave light with a wavelength $\lambda$=408 nm. A light path of this light is the light path that passed the above-mentioned respective optical elements and hence this light is irradiated on the optical recording medium master disc 11.

Returned light reflected back from the optical recording medium master disc 11 is introduced into the PBS 6*a* through the objective lens 8*a*, the mirror 1*c* and the quarter-wave plate 7. This returned light is passed through the quarter-wave plate 7 twice, and hence it is reflected by the PBS 6*a*. As a result, the PBS 6*a* of the auto focus optical system 6 supplies the returned light through the wavelength selection element 6*b* to the focus error amount detection element 6*c*. The wavelength selection element 6*b* is adapted to interrupt light with an exposure wavelength by utilizing a multilayer interference layer and the like because a large amount of the third higher harmonic wave light with an exposure wavelength also is reflected by the PBS 6*a*.

The focus error amount detection element 6*c* detects a position displacement amount in which exposure light is displaced from the most properly focused position when this exposure light is properly focused on the optical recording medium master disc 11 by a suitable method such as an astigmatism method, and converts the resultant detected amount into an electric signal. The thus detected electric signal is supplied to the drive control unit 6*d* which forms a part of the auto focus servo system 6.

The above-mentioned astigmatism method is a method in which a cylindrical lens is located behind the detection lens, the photo-detector actively using the astigmatism to detect the above position displacement amount. Since this cylindrical lens has a lens action of only one direction and also has the same action as that of a parallel plate in the direction perpendicular to this single direction, light is not converged at other portion than the focusing position of the detection lens and this cylindrical lens, and the cylindrical lens can detect a focus error signal when a narrow beam image is focused thereon. The focusing position of the objective lens can be kept at the optimum focusing position by controlling the focusing error signal such that the focusing error signal may be canceled out.

The drive control unit 6*d* generates a drive signal for correcting a position displacement based upon the electric signal and output this drive signal to the electromagnetic actuators 8*b*, 8*c* that fine moves the objective lens 8*a* in the up and down direction. The electromagnetic actuators 8*b*, 8*c* are adapted to fine move the objective lens 8*a* in the up and down direction shown by an arrow b, that is, in the direction in which the objective lens comes close to or away from the photoresist by the drive signal so that the properly focused position on the optical recording medium master disc 11 can automatically brought to the optimum position to thereby expose the photoresist without loss of light.

The spot size of the laser light could be reduced up to 0.36 μm as the Airy disc when a non-aberration lens with a numerical aperture NA=0.9 is used as the objective lens. Accordingly, when the two-photon absorption process could be generated, the photoresist could be exposed to the degree equivalent to the spot size of $0.36 \times (1/\sqrt{2}) \approx 0.25$(μm).

At that time, as described above, the beam expander 5 was composed of the anamorphic optical system to bring the oblong spot shape elongated in the beam scanning direction so that the groove patterns could be exposed while the groove width was formed as very small patterns as compared with the prior art.

The thus formed laser light is rotated and scanned on the optical recording medium master disc 11 by the rotating means 13. At the same time, the optical system containing the objective lens is moved from the disc center (master disc center) to the radius direction, whereby light beams are scanned on the master disc in a spiral fashion to expose the photoresist, thereby pits being formed on the master disc at high density.

As the photoresist 12, there can be used a g-ray positive type resist in addition to the above-mentioned i-ray resist. Since the resist is photo-sensitized by the photon mode recording, also in the case of ultrashort wave pulse light with high repetitive frequency, a photo-sensitized amount can be determined based on the calculated amount of photons per unit area. According to the present invention, unlike the case in which the resist is irradiated with continuous light, the resist is hardly photo-sensitized through the thermal mode. That is, the reaction can be restrained from becoming thick and the reaction speed can be restrained from being changed as the temperature in the resist is caused to rise due to an unnecessary resist. Thus, it becomes possible to form more miniscule pits.

While the case in which the ultrashort wave pulse laser has the center wavelength of 816 nm has been described so far in the above-mentioned inventive example, the Ti:Sapphire ultrashort wave pulse laser becomes able to oscillate at about 760 nm, and in this case, second higher harmonic wave light with a wavelength of 380 nm and third higher harmonic wave light with a wavelength of 253 nm can be used by the aforementioned similar means (all of center designed wavelengths should be varied). However, efficiency is lightly lowered so that energy of excitation green laser for exciting the laser medium of the ultrashort wave pulse laser light source should be increased.

Also, when a nonlinear optical crystal (for example, BBO) for use in mixing sum frequencies was added to the inventive arrangement, four-order higher harmonic wave (wavelength is 204 nm and average output is 12 mW) could be generated. In this case, an Airy spot of 0.28 μm could be obtained as the spot size of the beam by using a non-aberration objective lens with a numerical aperture NA of 0.9.

Therefore, the resist can be exposed with a spot size equivalent to a spot size of $0.28 \times (1/\sqrt{2})=0.2$ (μm).

In this case, a resist for use with a KrF laser (wavelength is 248 nm) or an ArF laser (wavelength is 192 nm) can be applied to the highly-sensitive resist.

While the third higher harmonic wave generating means has been so far explained by way of example as the higher order higher harmonic wave generating means in the above-mentioned inventive example 1, since the higher order higher harmonic wave generating means that has been described with reference to FIG. 5 has the second higher harmonic wave generating unit and the sum frequency mixing unit independently separated from each other, the second higher harmonic wave generating unit can also be used as the exposure light source. In this case, the second higher harmonic wave generation has a higher conversion efficient that that of the third higher harmonic wave generation so that not only second higher harmonic wave generation can obtain high exposure energy by the same excitation laser power but also the wavelength of laser light becomes close to a visible light region. As a result, a wide variety of glass materials can be used, and lens design can be facilitated. In addition, restrictions on the optical element can be decreased.

INVENTIVE EXAMPLE 2

The inventive example 2 will be described next.

In this inventive example, while the material and arrangement of the optical recording medium master disc exposure apparatus are exactly the same as those of the above-mentioned inventive example 1, the exposure light source was used in the condition in which its laser power intensity was increased about 10 times.

More specifically, this inventive example has used a ultrashort wave pulse laser light source using a Ti:Sapphire as a laser medium and of which average output is 2 W although it has a repetitive frequency of 66 MHz, a center wavelength of 816 nm and a pulse width of 80 fs as its exposure light source.

Further, in order to increase laser power intensity of higher order higher harmonic wave, the focal lengths of the condenser lenses 19a, 19b, 19c, 19d located ahead of and behind the respective nonlinear optical crystals 20, 24 were reduced much more to decrease the beam spot diameter within the crystal, thereby increasing intensity of electric field of excited light. As a result, laser power intensity of third higher harmonic wave was increased and hence laser power approximately ten times as high as that of the inventive example 1 was obtained. However, the pulse width thereof was increased slightly.

Ultrashort wave pulse light with a wavelength of 272 nm and a pulse width of 130 fs emitted from the third higher harmonic wave generating unit 28 was irradiated on an ArF laser photoresist, for example, a fluororesin-based resist used as the photoresist.

Intensity of light within the beam spot on the surface of the resist reaches 100 GW/cm$^2$ in view of the peak output so that the two-photon absorption occurred remarkably, thereby light absorption of several percents being made, that is, photo-addition, which is the exposure process of the resist, being advanced. Then, in this example, an Airy spot of 0.36 μm could be obtained by using a non-aberration objective lens with a numerical aperture NA=0.9 as the objective lens, and the two-photon absorption process could be produced, whereby the resist could be exposed with the beam spot of the Airy spot size of $0.36 \times (1/\sqrt{2})=0.25$ μm.

The exposure of resist is given by square of an intensity distribution of a beam spot. The above-mentioned resist is transparent relative to light having a wavelength of 269 nm and hence ordinary absorption cannot occur. Only the two-photon absorption process occurs only in the portion with a high intensity distribution. This resist can be substituted with not only an ArF laser (wavelength is 193 nm) resist (manufactured by Nippon Zeon Co. Ltd., under the trade name of "ZARF001", etc.) but also an F$_2$ laser fluororesin-based resist which is now under development.

Also in this case, the beam expander 5 was composed of the anamorphic optical system to provide the oblong spot shape extended in the beam scanning direction, whereby the groove patterns could be exposed with groove widths smaller than those of the prior art.

Further, also in this example, when the higher order higher harmonic wave generating means has the arrangement shown in FIG. 5 in which the second higher harmonic wave generating means and the sum frequency mixing portion are independently separated from each other, the second higher harmonic wave (wavelength is 403 nm) can be used as the exposure light source. It is desired that an ArF laser resist (manufactured by Nippon Zeon Co. Ltd., under the trade name of "ZARF001", etc.) or a KrF laser resist (manufactured by JSR Corp., under the trade name of "KRFM89Y", etc.) should be used as the photoresist used in this case.

Also, since the cross-section of the two-photon absorption is the very small value, in order to increase sensitivity of the resist, it is possible to use such a resist in which an organic dye having a high two-photon absorption cross-section is added to a resist as a sensitizer. This inventive example has advantages similar to those of the inventive example 1 and a range in which applicable photoresists can be selected is widened.

INVENTIVE EXAMPLE 3

Next, an optical recording medium master disc exposure apparatus according to another embodiment of the present invention will be described with reference to FIG. 1. Also in this example, this optical recording medium master disc exposure apparatus includes the exposure light source 1 serving as the Ti:Sapphire ultrashort wave pulse laser light source, the higher order higher harmonic wave generating means 2 using this ultrashort wave pulse laser as the excitation light source, the chirp correction optical system 4 having the negative group velocity dispersion to correct in advance the positive group velocity dispersion imposed upon the pulse outputted from these light beam when it passes through a wide variety of optical assemblies, the modulating means 3 for modulating intensity of light by switching at high speed these emitted light beams with the electric pulse signal corresponding to the supplied data and the beam expander 5 and the objective lens 8a for converging the light modulated by this modulating means 3 to the spot size of the diffraction limit onto the optical recording medium master disc 11 coated with the photoresist 12.

As the ultrashort wave pulse laser light source, there was used a Ti:Sapphire laser with a repetitive frequency of 750 MHz equal to or more than 10 times as high as the clock frequency (66 MHz) of the aforementioned Blu-ray Disc and which has a center wavelength of 816 nm, a pulse width of 80 fs and an average output of 1.5 W.

A second higher harmonic wave with a wavelength of 408 nm or a third higher harmonic wave with a wavelength of 272 nm was generated by using the aforementioned higher order higher harmonic wave generating means 3 that has been described with reference to FIG. 5. In this example, as the nonlinear optical crystal 20 of the second higher harmonic wave generating means 26 shown in FIG. 5, there was used an LBO crystal for making the type I phase-matching. Also, as the nonlinear optical crystal 24 of the third higher harmonic wave generating unit 28, there was used a BBO for making the type I phase-matching. Various kinds of lenses 19a to 19d are located in order to increase strength of light beam within the crystal to thereby increase the conversion efficiency. The second higher harmonic wave light could produce emitted light in which it has an average output of 20 mW and a pulse width of 100 fs and the third higher harmonic wave light could produce emitted light in which it has an average output of 4 mW and a pulse width (FWHM) of 130 fs that is less than 1 ps.

Figure 4C:
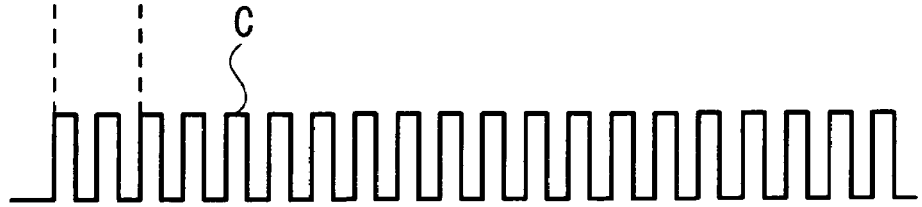
FIG. 4C is a diagram used to explain an example of pulse waveform of a clock signal.

In addition, also in this example, a Brewster prism pair was used as the chirp correction optical system 4 shown in FIG. 4. As shown in FIG. 1, the light emitted from the chirp correction optical system 4 is reflected 90° by the mirror 1a and then supplied to the light intensity modulating means 3. The light intensity modulator in the modulating means 3 is composed of the electro-optic element EOM having the signal modulation band of 50 MHz and is supplied with a pit recording signal from the so-called formatter in which the information recorded on the optical recording medium master disc produces the electrical signal through the input terminal and modulates light in response to this recording information.

The thus light-modulated light is reflected 90° by the mirror 1b as described above and passed through the beam expander 5 and the polarizing beam splitter (PBS) 6a and the quarter-wave plate 7 of the focus detection control system 6, whereafter it was reflected 90° by the mirror 1c, passed through the objective lens 8a with the high numerical aperture NA and irradiated on the optical recording medium master disc 11 on which the photoresist 12 has been coated in advance.

As this photoresist 12, there can be used an i-ray resist (manufactured by JSR Corporation., under the trade name of "PFRIX1110G", etc.) and a Kr laser mastering resist (manufactured by Nippon Zeon Co. Ltd., under the trade name of "DVR-100", etc.).

At that time, the objective lens 8a is composed of an objective lens with a high numerical aperture NA value which was corrected in aberration to incident light, for example, light with a wavelength $\lambda$ of 272 nm to focus the light beam up to the diffraction limit and thereby light is irradiated on the optical recording medium master disc. Also, as this objective lens 8a, there was used an achromatic objective lens which is made of a suitable material such as synthetic quarts or silica rock that can sufficiently pass light of this wavelength region therethrough.

The higher order harmonic wave generating means 2 emits third higher harmonic wave light having a wavelength $\lambda$ of 272 nm and second higher harmonic wave light having a wavelength $\lambda$ of 408 nm at the same time. The light path of this light is identical to the light path that passes through the respective optical elements and thereby light is irradiated on the optical recording medium master disc 11. A rest of arrangement is similar to that of the aforementioned inventive example 1.

Also in this inventive example, the spot size of the laser light can be reduced up to 0.36 μm with respect to the Airy disc when the non-aberration lens with a numerical aperture NA of 0.9 is used as the objective lens. Accordingly, the photoresist can be exposed to an extent corresponding to the spot size of $0.36 \times (1/\sqrt{2}) \approx 0.25$ (μm).

The thus formed laser light is rotated and scanned on the disc by the disc rotation mechanism and at the same time the optical system including the objective lens is moved from the disc center to the radius direction, whereby laser beams are spirally scanned on the disc to expose the photoresist to form pits at high density. A g-ray or i-ray positive type resist is used as the photoresist. Since the resist is exposed in the photon mode recording, also in the case of the ultrashort wave pulse light of high repetitive frequency, the exposure amount is determined by the calculated amount of photons per unit area. According to the present invention, unlike the case in which continuous light is irradiated on the photoresist, the photoresist is hardly exposed through the thermal mode. That is, the photoresist can be prevented from being expanded by the undesired rise of temperature on the resist, and the reaction rate can be restrained from being changed, thereby making it possible to form more miniscule pits.

While the inventive example 3 has described so far the case in which the center wavelength is 816 nm, the Ti:Sapphire ultrashort wave pulse laser is able to oscillate at a wavelength of approximately 760 nm. In this case, the means (all center design wavelengths should be varied) similar to the aforementioned means can use second higher harmonic wave light with a wavelength of 380 nm and third higher harmonic wave light with a wavelength of 253 nm. However, efficiency is slightly lowered, and hence the output from the excitation green laser should be increased.

Also, it can be considered to use four order higher harmonic wave generation (wavelength is near 200 nm) by further adding the nonlinear optical crystal (BBO) for use in mixing sum frequencies. In this case, an Airy spot of 0.28 μm is obtained as the beam spot size by using a non-aberration lens with a numerical aperture NA of 0.9. Accordingly, the photoresist can be exposed to an extent corresponding to the spot size of $0.28 \times (1/\sqrt{2}) \approx 0.2$ (μm). It is possible to solve the problem in which laser power of the light source is low by decreasing the scanning speed of exposure light, that is, the revolution rate of the optical recording medium master disc although an average output is approximately as low as several 10 s of microwatts.

Also, while the third higher harmonic wave generating means has been described as the higher order higher harmonic wave generating means in the above-mentioned inventive example 3, since the above-mentioned higher order higher harmonic wave generating means that has been described so far with reference to FIG. 5 is independently separated into the second higher harmonic wave generating unit and the sum frequency mixing unit, the second higher harmonic wave can be used as the exposure light source. In this case, since the second higher harmonic wave generation is higher in conversion efficiency as compared with the third higher harmonic wave generation, not only it can obtain exposure power at the same excitation laser power but also the wavelength of laser light is near the visible light region. Hence, the second higher harmonic wave generation can use a wide variety of glass, and the lens can be designed with ease. In addition, restrictions imposed upon the optical element can be decreased.

INVENTIVE EXAMPLE 4

Next, the inventive example 4 will be described.

In this inventive example, although materials and arrangement of the optical recording medium master disc exposure apparatus are exactly the same as those of the inventive example 3, in order to increase the laser power intensity of the higher order higher harmonic wave, the focal lengths of the condenser lenses which are located ahead of the respective nonlinear optical crystals are reduced much more to reduce the diameter of the beam spot, thereby resulting in the wavelength conversion efficiency being increased.

Also in this inventive example, the Ti:Sapphire ultrashort wave pulse laser with the repetitive frequency of 750 MHz, the center frequency of 816 nm, the pulse width of 80 fs and the average output of 1.5 W was used as the exposure light source 1.

When ultrashort wave pulse light of 130 fs with a wavelength of 272 nm and a pulse width of less than 1 ps emitted from the third higher harmonic wave generating means is irradiated on the fluororesin, for example, of the ArF laser photoresist, the light intensity within the beam spot on the resist surface reaches 100 GW/cm$^2$ in view of the peak output so that the two-photon absorption occurs remarkably to absorb several percents of photons, that is, photo-reaction which is the exposure process of the resist proceeds. According to this inventive example, an Airy spot of 0.36 μm could be obtained by using the non-aberration lens with the numerical aperture NA=0.9 as the objective lens, and the photoresist could be exposed with an Airy spot size of $0.36 \times (1/\sqrt{2})=0.25$ μm.

As described above, the exposure of the resist is given by the square of the intensity distribution of the beam spot. That is, also in this case, since the resist is transparent to light with a wavelength of 272 nm, ordinary absorption does not occur in this resist and only the two-photon absorption process locally occurs in the portion with high intensity distribution. Then, also in this case, this resist can be substituted by not only an ArF laser (wavelength is 193 nm) resist (manufactured by Nippon Zeon Co. Ltd., under the trade name of "ZARF001", etc.) but also an F$_2$ laser fluororesin-based resist which is now under development.

Also in this inventive example, since the higher order higher harmonic wave generating means has the arrangement in which the second higher harmonic wave generating means and the sum frequency mixing portion are independently separated from each other as shown in FIG. 5, a second higher harmonic wave (wavelength is 403 nm) can be used as the exposure light source. In this case, it is desired that the ArF laser resist (manufactured by Nippon Zeon Co. Ltd., under the trade name of "ZARF001", etc.) or the KrF laser resist (manufactured by JSR Corporation under the trade name of "KRFM89Y", etc.) should be used as the photoresist used herein.

Also in this case, in order to increase the sensitivity of the resist, it is possible to use the resist in which the organic dye having large two-photon absorption cross-section is added to the resist as the photosensitizer. This inventive example has similar advantages to those of the inventive example, and a range in which applicable photoresists are selected can be extended.

In the above-mentioned inventive examples 3 and 4, the repetitive frequency of the ultrashort wave pulse laser was selected to be equal to or more than 10 times as high as the clock frequency of the recording information of the optical recording medium, whereby a displacement between the repetitive frequency and the clock frequency of the recording information of the optical recording medium could be selected to be equal to or less than 1/10 of the clock, and hence jitter could be suppressed to be equal to or less than 10%.

Also, as described above, if the repetitive frequency is increased too much, then the peak output of the pulse is lowered and the two-photon absorption becomes difficult to occur so that the pattern cannot be exposed with high resolution. Accordingly, in the above-mentioned present invention, having considered the maximum output of the ultrashort wave pulse laser light source available at present and clock frequencies of various kinds of optical recording mediums which are now under development, the limit of the repetitive frequency is selected to be equal to or less than approximately 20 times as high as the clock frequency of the optical recording medium to be exposed.

Also, while the Ti:Sapphire ultrashort wave pulse laser has been described so far as the example of the light source means in the above-mentioned embodiments and the respective inventive examples, the present invention is not limited thereto, and it is possible to use various ultrashort wave pulse laser light sources.

For example, an Nd:Vanadete ultrashort wave pulse laser is now commercially available on the market, in which it can excite the semiconductor laser. This ultrashort wave pulse laser uses a semiconductor saturable absorption mirror (SESAM) and has a center wavelength of 1064 nm, a pulse width of 7 ps, an average output of several watts and a repetitive frequency ranging from 25 MHz to 1 GHz. A ultrashort wave pulse laser of this type having a center wavelength of 917 nm also is commercially available on the market. Also, a ultrashort wave pulse laser using a solid-state laser medium such as a Cr:LiSAF, Nd:Glass has a pulse width of equal to or less than 100 fs and center wavelengths of 850 nm and 1058 nm.

In the higher order higher harmonic wave generating means, as the nonlinear crystal optical element including the sum frequency mixing, the second higher harmonic wave generation and the fourth higher harmonic wave generation and the like, there can be enumerated KDP, KTP, LN or period polarization inversion type KTP (PPKTP), PPLN, LBO, LiIO$_2$, CBO and the like in addition to the BBO.

Further, while the present invention has been described so far with reference to the exposure of miniscule pits and grooves by way of example, since the exposure light source according to the present invention can be treated similarly to the continuous light light source according to the prior art, not only the miniscule pits and the grooves can be formed but also wobbling addresses can be similarly formed by using a light deflector which makes effective use of acousto-optic effect or Pockels effect.

Furthermore, the present invention is not limited to the exposure apparatus and exposure method of disc-like optical recording medium master disc and can be applied to a laser writing apparatus of an X-Y linear scanning system using a highly-precise linear actuator instead of the rotating means 13 shown in FIG. 1 or a three-dimension microminiaturization working apparatus including a z-direction slide mechanism in addition to the rotating system and the X-Y linear scanning system.

In the optical recording medium master disc exposure apparatus and the optical recording medium exposure method of the present invention, the pulse of the repetitive frequency of the ultrashort wave pulse laser light outputted from the exposure light source or the pulse of the repetitive frequency of the ultrashort wave pulse laser light with short wavelength outputted from the higher order higher harmonic wave generating means using this ultrashort wave pulse laser as its excitation light source is adjusted such that it may become an integral multiple ranging from 1 time to 20 times as high as the clock frequency of the information signal recorded on the optical recording medium to thereby expose the photoresist. As a result, the two-photon absorption process can occur so that very small pits of approximately equal to or less than 0.25 μm can be formed at high accuracy as compared with the prior art.

Also, since the pulse width of the ultrashort wave pulse laser is selected to be equal to or less than $1 \times 10^{-12}$ second, the two-photon absorption process can be generated more efficiently, and hence it becomes possible to form more miniscule pits which are less than the diffraction limit of the wavelength of the exposure light source.

Further, in the above-mentioned present invention, since the beam spot of the laser light irradiated on the optical recording medium master disc is formed as the oblong beam spot, a signal with a pattern extended in the scanning direction of the grove and the like also can be pattern-exposed with a satisfactory shape.

Also, according to another aspect of the present invention, since the pulse of the repetitive frequency of the ultrashort wave pulse laser light outputted from the exposure light source or the pulse of the repetitive frequency of the ultrashort wave pulse laser light with short wavelength outputted from the higher order higher harmonic wave generating means using this ultrashort wave pulse laser as its excitation light source is adjusted such that it may fall within a range of 1 time to 20 times as high as the clock frequency of the recording information signal, this pulse laser light is modulated by the modulating means for modulating intensity of light and then focused at the spot size of the diffraction limit by the focusing optical system to thereby expose the photoresist, the photoresist can be exposed with patterns smaller than those of the prior art.

Particularly, in this case, since the two-photon absorption process occurs and further the higher order higher harmonic wave generating means uses the ultrasshort wave pulse laser with shorter wavelength, it is possible to expose the smaller pattern of equal to or less than 0.25 μm.

Further, according to the above-mentioned present invention, since the pulse width of the ultrashort wave pulse laser is selected to be equal to or less than $1 \times 10^{-12}$ second so that the two-photon absorption process can occur more efficiently, it becomes possible to form smaller pits which are under the diffraction limit of the wavelength of the exposure light source.

Furthermore, according to the above-mentioned respective aspects of the present invention, since the aforementioned near-field optical system using the SIL with the high numerical aperture is not used but a far-field optical system can be used, a working distance can be increased sufficiently and the revolution rate required when the photoresist is exposed can be increased, thereby making it possible to considerably increase a productivity.

| DESCRIPTION OF REFERENCE NUMERALS | |
|---|---|
| 1 | exposure light source |
| 1a, 1b, 1c | mirror |
| 2 | higher order higher harmonic wave generating means |
| 3 | modulating means |
| 4 | chirp correction optical system |
| 5 | beam expander |
| 6 | auto focus optical system |
| 6a | polarizing beam splitter |
| 6b | wavelength selection element |
| 6c | focus error amount detection element |
| 6d | drive control unit |
| 7 | quarterwave plate |
| 8a | objective lens |
| 8b, 8c | electromagnetic actuator |
| 9 | focusing optical system |
| 10 | turntable |
| 11 | optical recording medium master disc |
| 12 | photoresist |
| 13 | rotation means |
| 19a, 19b, 19c, 19d | lens |
| 20 | nonlinear optical crystal |
| 21a, 21b, 21c, 21d | harmonic separator |
| 22a, 22b, 22c, 22d | high reflection mirror |
| 23 | halfwave plate |
| 24 | nonlinear optical crystal |
| 25 | beam stopper |
| 26 | second higher harmonic wave generating unit |
| 27 | delay line unit |
| 28 | third higher harmonic wave generating unit |
| 31 | lens |
| 32, 33 | spherical mirror |
| 34 | laser medium |
| 35 | high reflection mirror |
| 36a, 36b | dispersion compensation prism |
| 37 | split |
| 38 | high reflection mirror |
| 39 | output window |
| 40 | beam splitter |
| 41 | photo-detector |
| 46 | piezo-element |

The invention claimed is:

1. An optical recording medium master disc exposure apparatus comprising:

an exposure light source which generates an ultrashort wave pulse laser light with a resonator arrangement having a resonator path with a resonator length;

a modulating means for modulating intensity of light from said exposure light source in response to recording information; and a focusing optical system for focusing light modulated by said modulating means on a photoresist on an optical recording medium master disc to thereby pattern-expose said photoresist in response to said recording information, wherein, said ultrashort wave pulse laser light has a repetitive frequency which is synchronized to be an integral multiple in a range from one time to 20 times as high as the clock frequency of said recording information, and said optical recording medium master disc exposure apparatus includes a synchronizing mechanism for varying the resonator length of said ultrashort wave pulse laser to mode-lock the repetitive frequency of said ultrashort wave pulse laser light in synchronism with said clock frequency to thereby cause said ultrashort wave pulse laser to emit light pulses at said repetitive frequency, said synchronizing mechanism operative to compare said clock frequency with a frequency of said ultrashort wave pulse laser light and to vary said resonator length.

2. An optical recording medium master disc exposure apparatus according to claim 1 characterized in that said exposure light source and said modulating means have disposed therebetween a higher order higher harmonic wave generating means using said ultrashort wave pulse laser light source as an excitation light source to emit light of which wavelength is reduced by wavelength-conversion using a nonlinear optical element.

3. An optical recording medium master disc exposure apparatus according to claim 1, characterized in that said photoresist is exposed by a two-photon absorption process.

4. An optical recording medium master disc exposure apparatus according to claim 2, characterized in that said photoresist is exposed by a two-photon absorption process.

5. An optical recording medium master disc exposure apparatus according to claim 3, characterized in that said exposure light source laser light has a pulse width of equal to or less than $1 \times 10^{-12}$ second.

6. An optical recording medium master disc exposure apparatus according to claim 4, characterized in that said exposure light source laser light has a pulse width of equal to or less than $1 \times 10^{-12}$ second.

7. An optical recording medium master disc exposure apparatus according to claim 3, characterized in that a spot shape of laser light focused on said photoresist after it has been emitted from said focusing optical system is an oblong spot shape extended in the scanning direction of said laser light.

8. An optical recording medium master disc exposure apparatus according to claim 4, characterized in that a spot shape of laser light focused on said photoresist after it has been emitted from said focusing optical system is an oblong spot shape extended in the scanning direction of said laser light.

9. An optical recording medium master disc exposure method comprising the steps of:
   resonating a laser light of an exposure light source along a resonator path having a resonator length, said laser light being an ultrashort wave pulse laser;
   modulating intensity of light from said exposure light source in response to recording information;
   focusing light modulated by said modulating means on a photoresist on an optical recording medium master disc to thereby pattern-expose said photoresist in response to said recording information,
   comparing a clock frequency of said recording information with a pulse frequency of said ultrashort wave pulse laser light;
   varying said resonator length to mode-lock the repetitive frequency of said ultrashort wave pulse laser in synchronism with said clock frequency to thereby cause said ultrashort wave pulse laser to emit pulses,
   wherein,
   said ultrashort wave pulse laser has a repetitive frequency which is an integral multiple in a range from one time to 20 times as high as the clock frequency of said recording information.

10. An optical recording medium master disc exposure method according to claim 9, characterized in that a higher order higher harmonic wave generating means uses said exposure light source as an excitation light source to emit light emitted from said exposure light source and of which wavelength is reduced by wavelength-conversion using a nonlinear optical element.

11. An optical recording medium master disc exposure method according to claim 9, characterized in that a spot shape of laser light focused on said photoresist after it has been emitted from said focusing optical system is an oblong spot shape extended in the scanning direction of said laser light.

12. An optical recording medium master disc exposure method according to claim 10, characterized in that a spot shape of laser light focused on said photoresist after it has been emitted from said focusing optical system is an oblong spot shape extended in the scanning direction of said laser light.

13. An optical recording medium master disc exposure apparatus comprising:
   an exposure light source which generates an ultrashort wave pulse laser light with a resonator arrangement having a resonator path with a resonator length;
   a modulating means for modulating intensity of light from said exposure light source in response to recording information; and
   a focusing optical system for modulating the light modulated by said modulating means on a photoresist on an optical recording medium master disc to pattern-expose said photoresist in response to said recording information,
   wherein,
   said ultrashort wave pulse laser light has a repetitive frequency which is synchronized to be in a range from 10 times to 20 times as high as the clock frequency of said recording information,
   said exposure light source has a pulse width of equal to or less than about $1 \times 10^{-12}$ second, and
   said photoresist is exposed by a two-photon absorption process.

14. An optical recording medium master disc exposure apparatus according to claim 13, characterized in that said exposure light source and said modulating means have disposed therebetween a higher order higher harmonic wave generating means using said ultrashort wave pulse laser light source as an excitation light source to emit light of which wavelength is reduced by wavelength-conversion using a nonlinear optical element.

15. An optical recording medium master disc exposure apparatus according to claim 14, characterized in that said photoresist is exposed by a two-photon absorption process.

16. An optical recording medium master disc exposure apparatus according to claim 15, characterized in that said exposure light source has a pulse width of equal to or less than $1 \times 10^{-12}$ second.

17. An optical recording medium master disc exposure method comprising the steps of:
   resonating a laser light of an exposure light source along a resonator path having a resonator length, said laser light being an ultrashort wave pulse laser;
   modulating intensity of light from said exposure light source in response to recording information and focusing the light modulated by said modulating means on a photoresist on an optical recording medium master disc to pattern-expose said photoresist in response to said recording information; and
   synchronizing said ultrashort wave pulse laser with a recording information clock signal so as to have a repetitive frequency in a range from 10 times to 20 times as high as the clock frequency of said recording information, wherein, said exposure light source has a pulse width of equal to or less than about $1\times10^{-12}$ second, and said photoresist is exposed by a two-photon absorption process.

18. An optical recording medium master disc exposure method according to claim 17, characterized in that a higher order higher harmonic wave generating means uses said exposure light source as an excitation light source to emit light emitted from said exposure light source and of which wavelength is reduced by wavelength-conversion using a nonlinear optical element.

* * * * *